Oct. 23, 1962 E. A. BENDER ET AL 3,059,781
MATERIAL HANDLING DEVICE
Filed Jan. 21, 1958 9 Sheets-Sheet 1
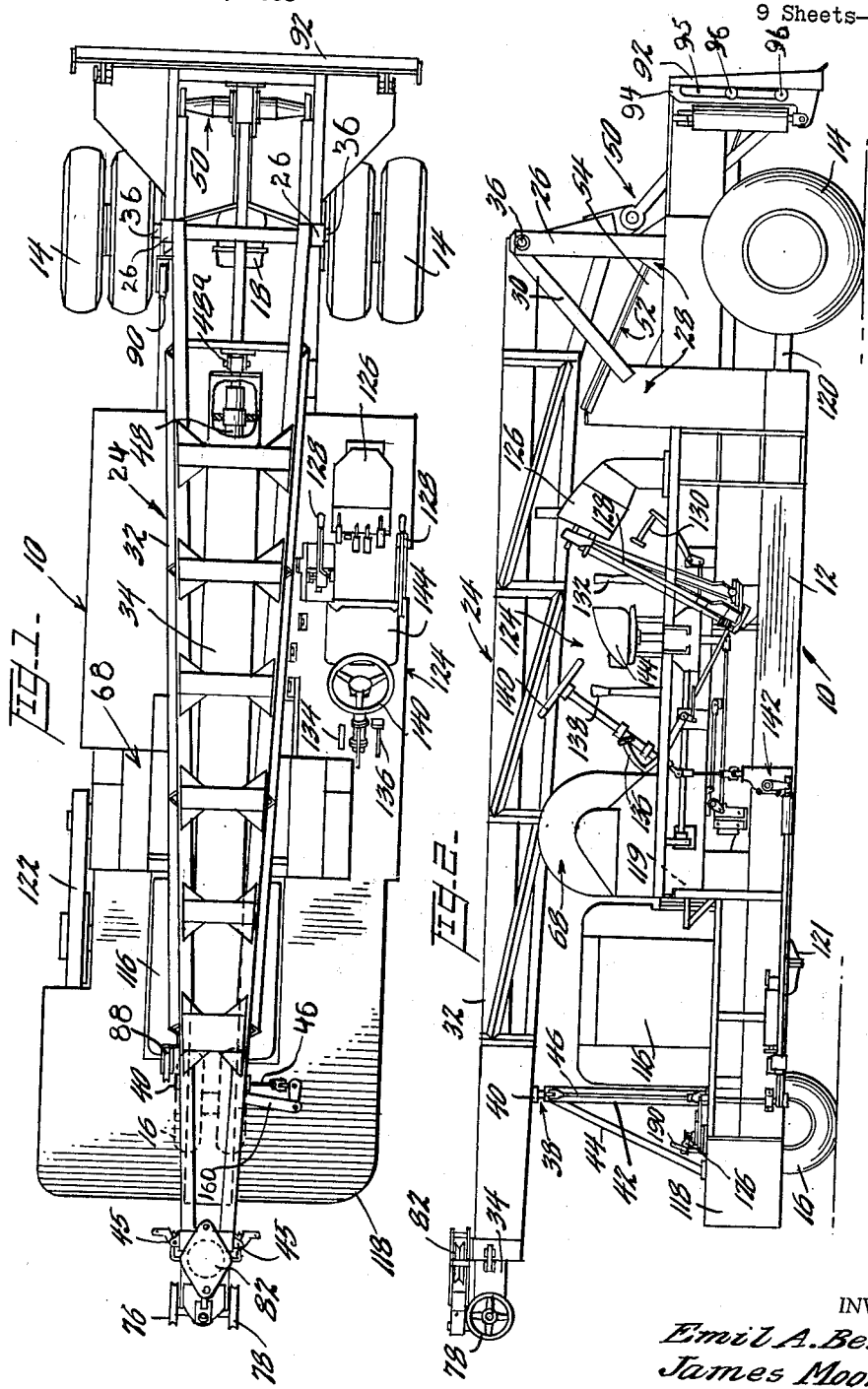
INVENTORS
Emil A. Bender
James Moon,
BY Parker and Welsh
ATTORNEYS

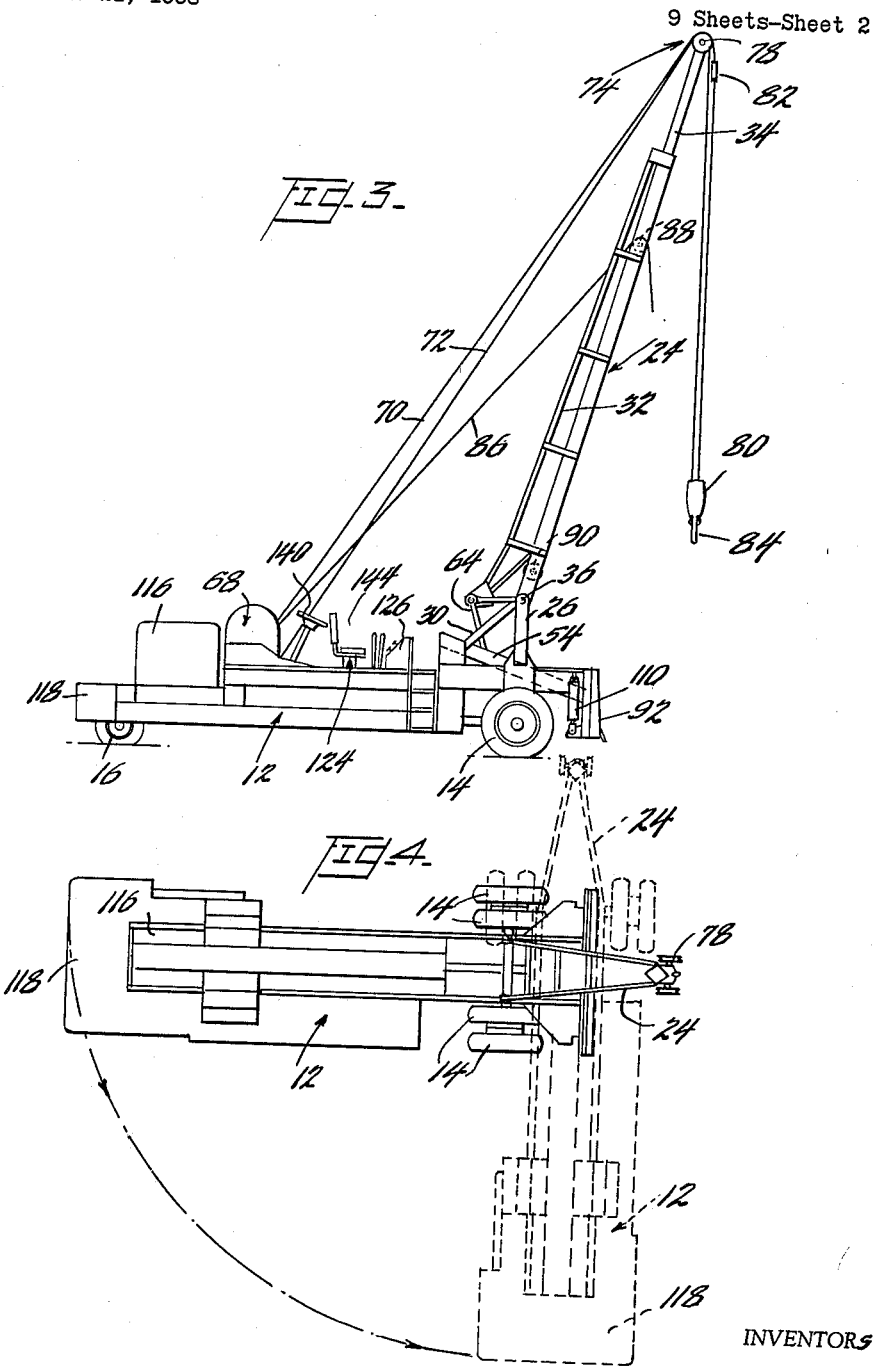

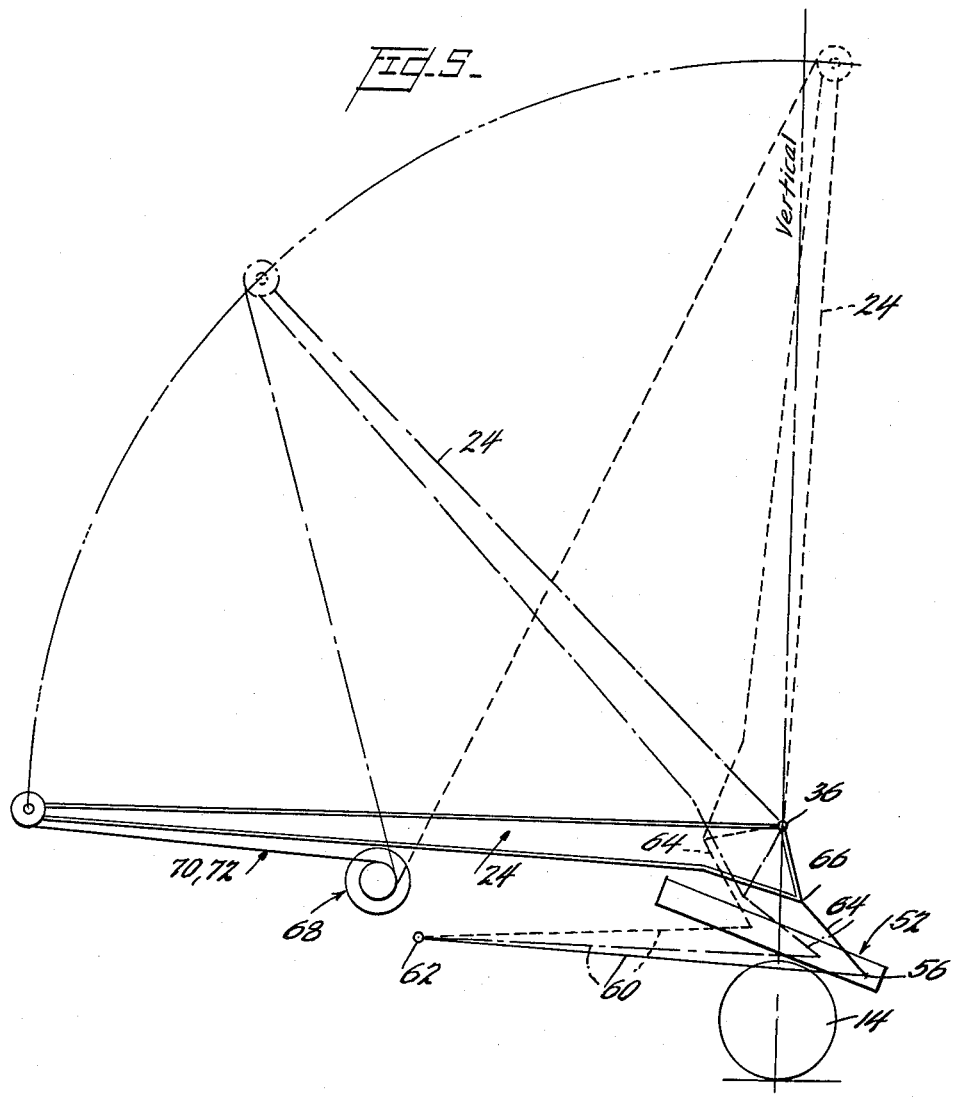

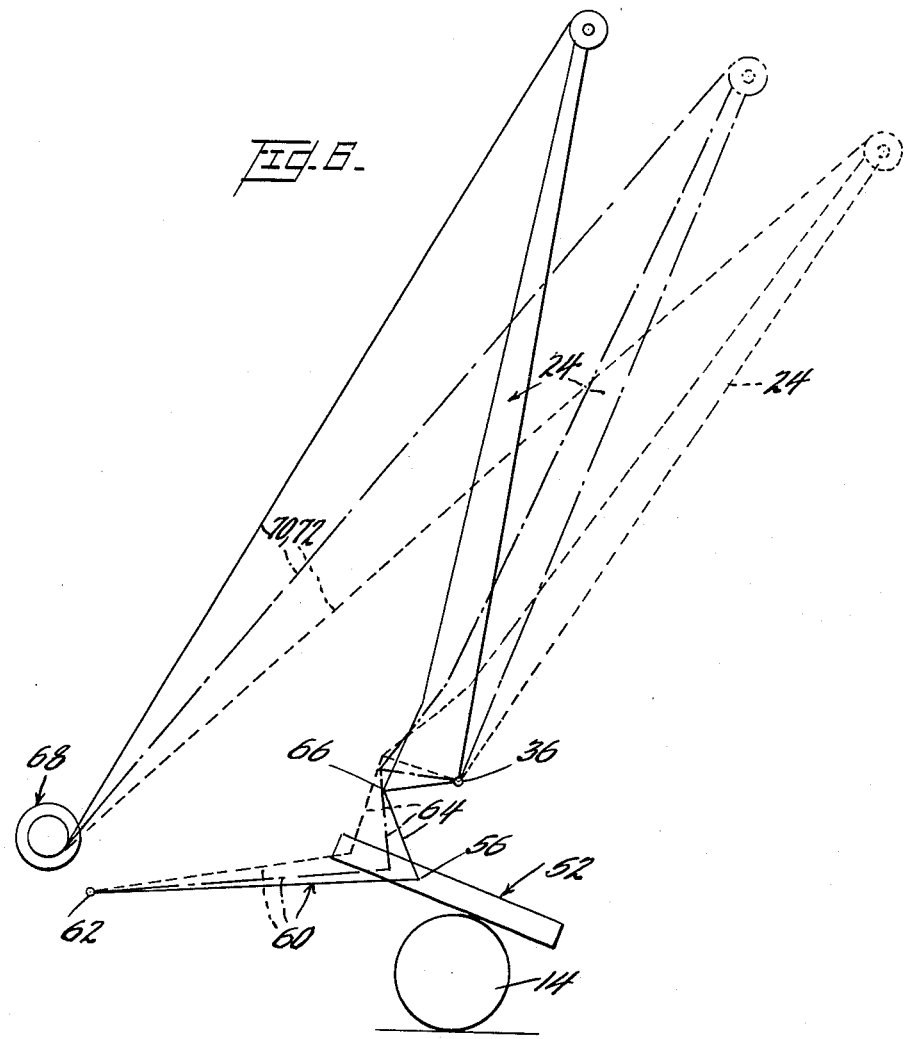

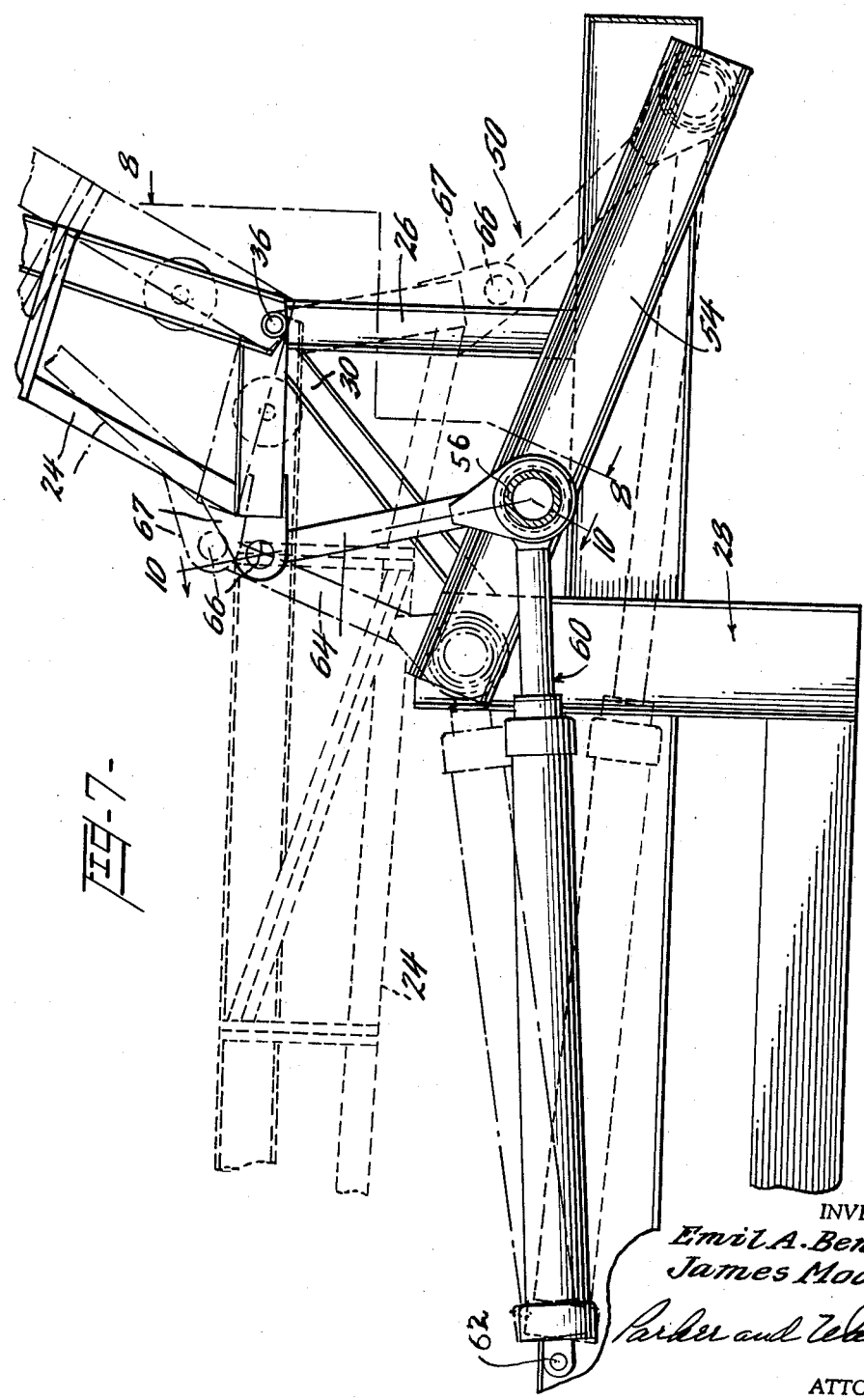

Oct. 23, 1962  E. A. BENDER ET AL  3,059,781
MATERIAL HANDLING DEVICE
Filed Jan. 21, 1958
9 Sheets-Sheet 6
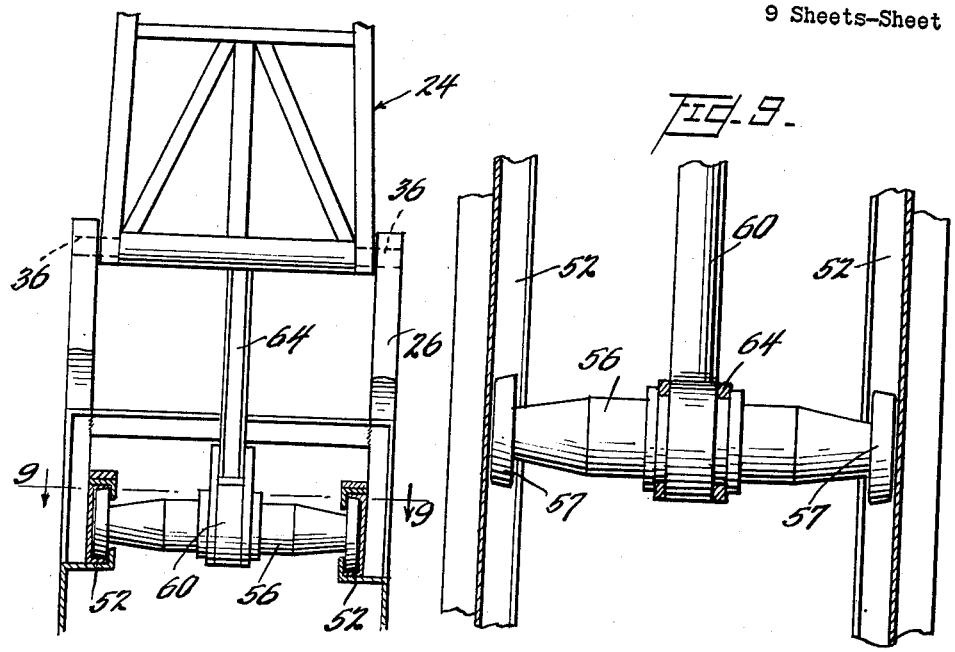
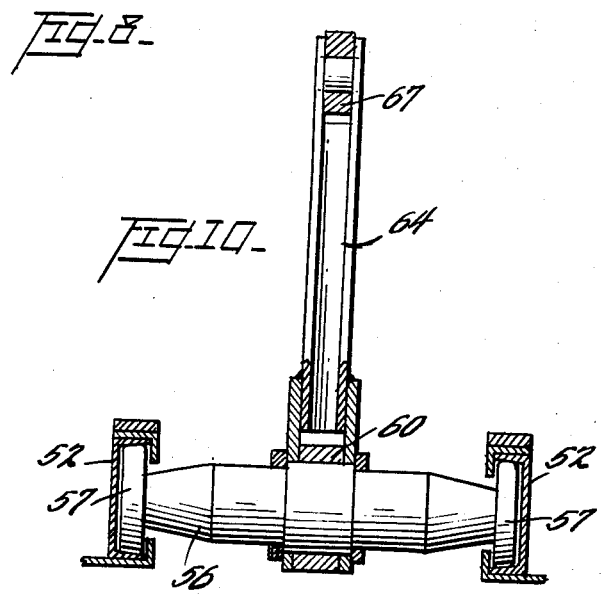
INVENTORS
Emil A. Bender
James Moon,
BY
ATTORNEYS

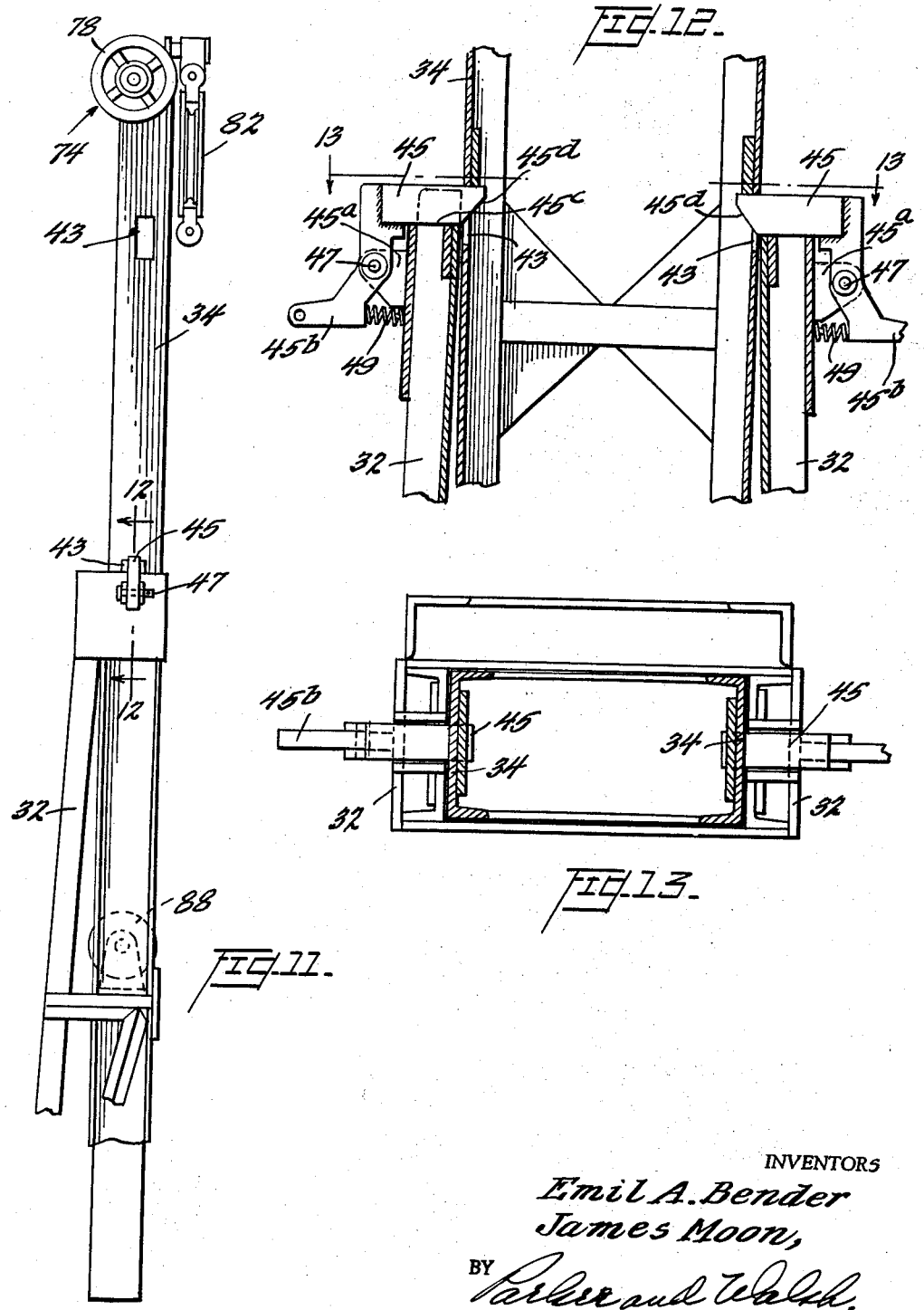

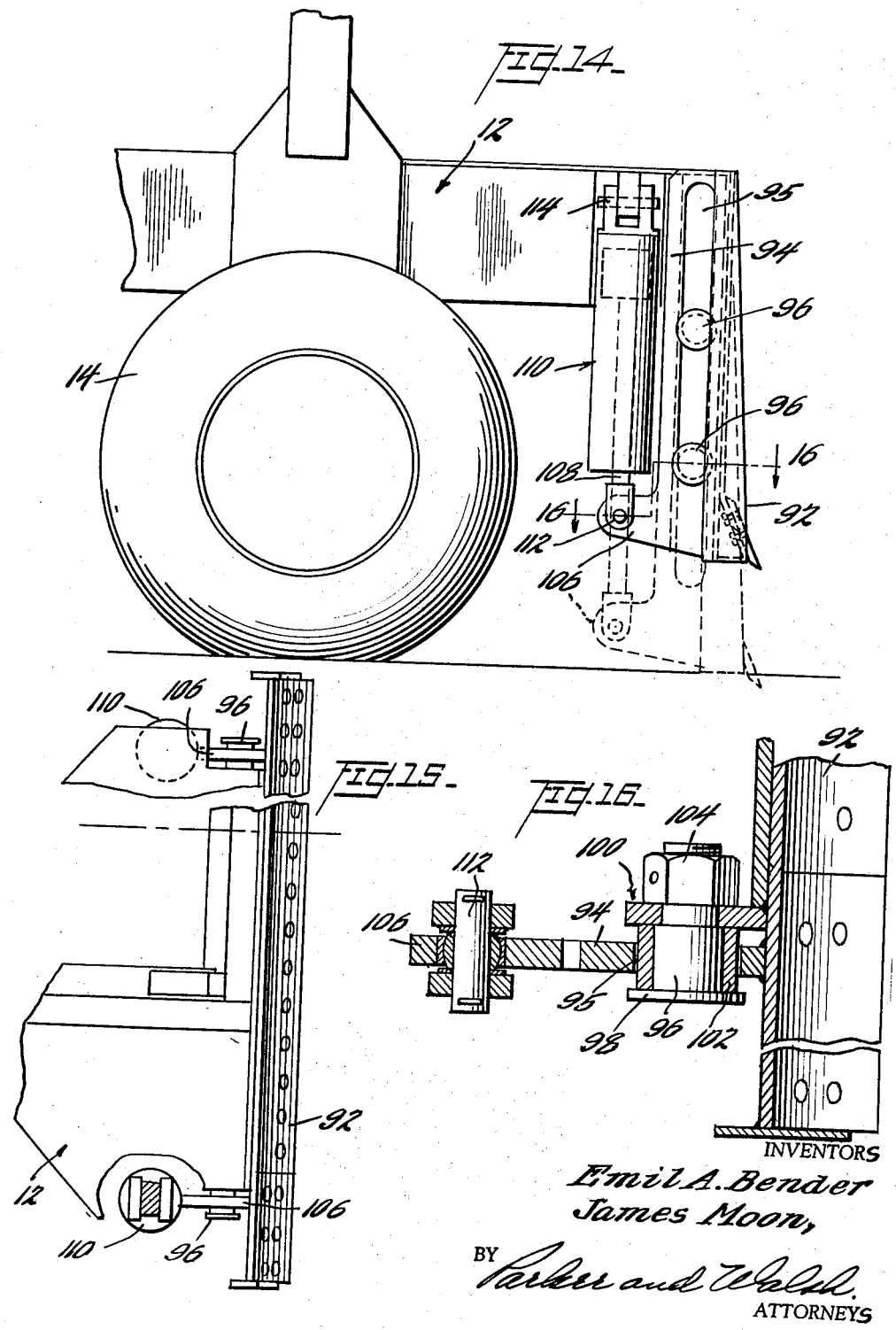

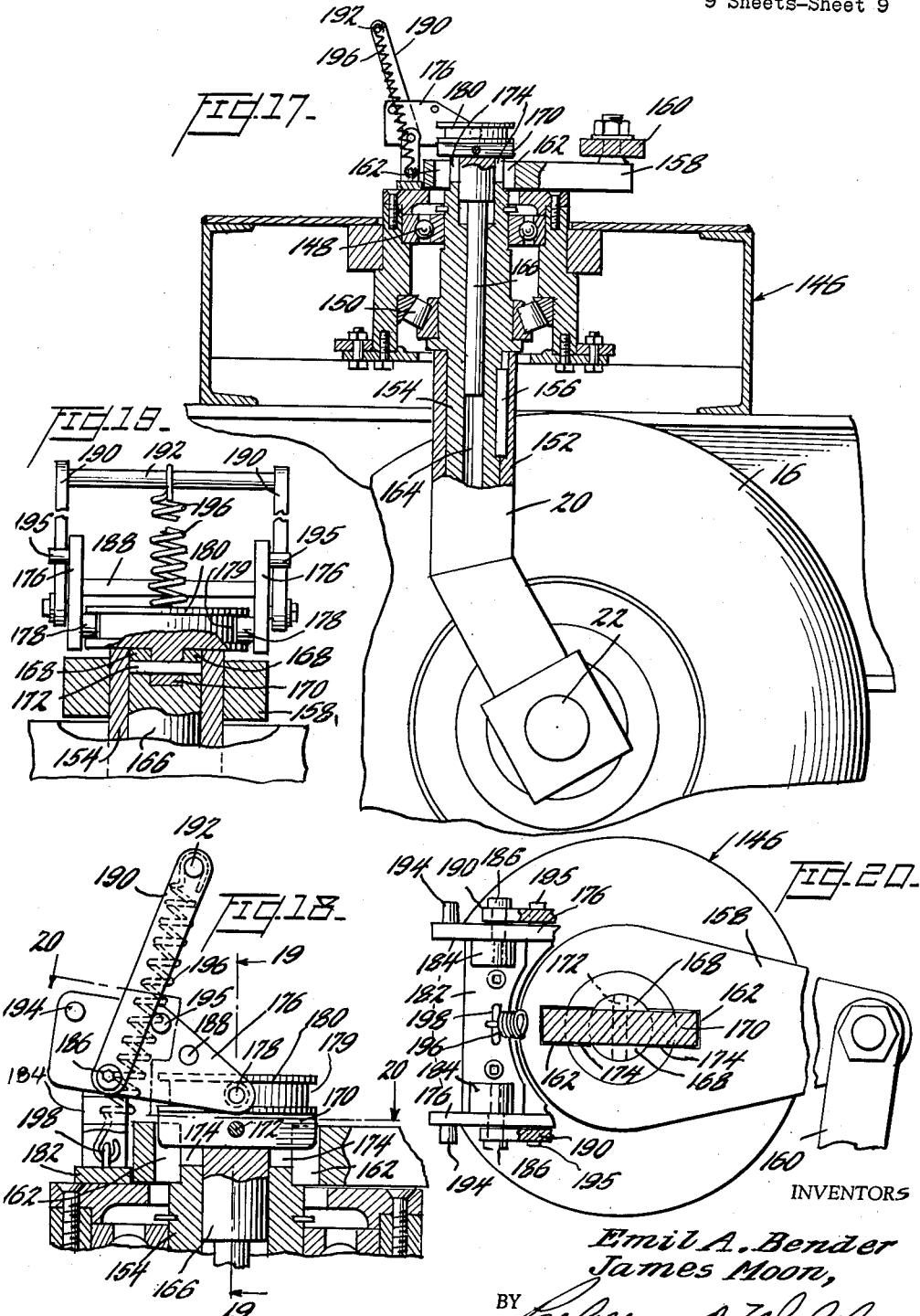

United States Patent Office 3,059,781
Patented Oct. 23, 1962

3,059,781
MATERIAL HANDLING DEVICE
Emil A. Bender, P.O. Box 52, Bakersfield, Calif., and James Moon, Santa Ana, Calif. (P.O. Box 497, Huntington Beach, Calif.)
Filed Jan. 21, 1958, Ser. No. 710,268
26 Claims. (Cl. 212—8)

This invention relates to a material handling device and more particularly to a self-propelled material handling vehicle.

In heavy industries, such as the oil and construction industries, it is frequently necessary to handle large quantities of heavy materials, such as sections of pipe, girders, and building blocks. Before the modernization of industry, the handling of such materials was a very difficult task. Notwithstanding the availability of primitive labor saving devices, such as the block and tackle, the lever, and the horse cart, a large amount of heavy work remained for human laborers.

As industry became modernized, the handling of heavy materials became somewhat easier. Trucks and cranes, the modern counterparts of the horse cart and the block and tackle, greatly reduced the work of human laborers, but even in modern times the lifting and moving of large quantities of heavy material is a difficult task. When the materials are to be moved substantial distances, they are first lifted by a crane or similar device, then loaded onto a truck, then moved to the site of a job, and finally unloaded. The procedure of using a crane or similar device to load and unload trucks, especially for relatively short hauls, is very inefficient.

The crane is a typical device for lifting heavy materials. The ordinary crane has a truck chassis and a surmounting traverse or rotating chassis on which the mast or boom of the crane is supported. The engine for operating the crane is conventionally located on the rotating chassis, serving to counterbalance somewhat the weight of the mast, and the rotating mechanism of the crane is very heavy and expensive because of the weight carried by the rotating chassis and the forces exerted on the rotating mechanism by the crane parts and the load. While cranes frequently have some propulsion system for moving them over short distances, to move a crane any substantialy distance it is sometimes necessary to load the crane onto a flat-bed trailer truck and thereby to transport the crane to the desired site of operation. Because of the obstruction to traffic, especially the obstruction created by the long mast, it is usually necessary to obtain a permit to move a crane over public streets, and such movement is frequently restricted to use on week days. A crane is essentially a lifting device, not a lifting and moving device, and while the load may be lifted and turned to the side of the main chassis, the stability of the crane is much less for side loads. When outriggers are employed in an attempt to increase such stability, any inherent mobility of the crane is completely lost. The same deficiencies are characteristic of "clam shells," drag lines, and similar devices which are basically cranes.

It is thus apparent that a need exists for a material handling device that will overcome the foregoing deficiencies, and it is accordingly a principal object of the invention to provide such a device.

Another object of the invention is to provide an improved self-propelled material handling device.

A further object of the invention is to provide a material handling device that is entirely stable, both loaded and unloaded.

An additional object of the invention is to provide a material handling device that is capable of lifting and turning heavy loads.

Another object of the invention is to provide a material handling device of large capacity yet small enough and light enough to be completely legal so it can be moved without restriction.

Yet another object of the invention is to provide a material handling device that is capable of lifting and carrying heavy loads for considerable distances.

Still another object of the invention is to provide a material handling device that is smaller in size and lighter in weight than comparable devices known heretofore.

A further object of the invention is to provide a material handling device of the aforesaid type that is more versatile than any comparable device known heretofore.

A still further object of the invention is to provide a material handling device which combines the functions of a crane, a truck, and even a bulldozer.

An additional object of the invention is to provide a unique vehicle.

A still further object of the invention is to provide a vehicle having a unique system of steering.

Yet another object of the invention is to provide a vehicle having a unique system of controls.

A further object of the invention is to provide a unique vehicle having a first steering system employed in turning loads and moving loads over moderate distances, and a second steering system employed in moving the vehicle on roads over considerable distances.

Another object of the invention is to provide a unique vehicle having sets of controls located on opposite sides of the driver's station, the arrangement being such that the driver may face forward or rearward depending upon the operations to be controlled.

Still another object of the invention is to provide a novel mast construction.

A more specific object of the invention is to provide a novel extensible mast construction.

Another specific object of the invention is to provide a novel mast construction which permits the mast to be moved by a relatively small, light weight driving mechanism.

A further object of the invention is to provide a unique mast moving mechanism.

A more specific object of the invention is to provide a mast moving mechanism which is arranged to have substantially zero loading for certain positions of the mast.

An additional object of the invention is to provide a unique vehicle having a mast.

A more specific object of the invention is to provide such a vehicle in which the mast may be extended beyond one end of the vehicle when engaged in material handling operations and may be folded back over the vehicle frame to a rest position which permits the vehicle to move upon public streets without restriction.

Yet another specific object of the invention is to provide such a vehicle in which the mast raising time is extremely short.

A still further object of the invention is to provide a vehicle of the foregoing type which may be operated completely by one man.

Another object of the invention is to provide such a vehicle which utilizes a single engine to provide power for the performance of all of its functions.

A further object of the invention is to provide a vehicle of the foregoing type having means for increasing its longitudinal stability for very heavy loads.

Another object of the invention is to provide a unique material handling vehicle having a mast supported on a frame in such a manner that the mast may pivot about a single horizontal axis but is prevented from pivoting with respect to said frame about any other axis, either horizontal or vertical.

An additional specific object of the invention is to provide a unique system for releasably locking a wheel to a steering system, whereby the wheel may be steered or permitted to swivel freely, selectively.

The foregoing and other objects of the invention and the manner in which such objects are accomplished will become more readily apparent upon consideration of the following detailed description of the invention when taken in conjunction with the accompanying drawings, which illustrate an exemplary embodiment of the invention, and wherein:

FIGURE 1 is a plan view of the device of the invention, shown with the mast lowered;

FIGURE 2 is a corresponding side elevation view of the device of the invention;

FIGURE 3 is a side elevation view of the device of the invention with the mast shown raised;

FIGURE 4 is a corresponding plan view of the device of the invention illustrating the manner in which the device operates to turn a load;

FIGURE 5 is a diagram illustrating the mast raising operation from the rest position to a position slightly beyond vertical;

FIGURE 6 is a similar diagram illustrating positions in which the mast extends forwardly of the vertical position;

FIGURE 7 is an explanatory side elevation view of the mechanism for moving the mast and illustrating the positions of the parts for several different positions of the mast;

FIGURE 8 is a sectional view of the mast moving mechanism taken along line 8—8 of FIGURE 7;

FIGURE 9 is a sectional view taken along line 9—9 of FIGURE 8;

FIGURE 10 is a sectional view taken along line 10—10 of FIGURE 7;

FIGURE 11 is a side elevation view of a portion of the mast of the invention;

FIGURE 12 is a sectional view taken along line 12—12 of FIGURE 11;

FIGURE 13 is a sectional view taken along line 13—13 of FIGURE 12;

FIGURE 14 is a side elevation view of a frontal portion of the invention, which includes a movable bulldozer blade;

FIGURE 15 is a contracted plan view (partly in section) of the frontal portion of FIGURE 14;

FIGURE 16 is a sectional view taken along line 16—16 of FIGURE 14;

FIGURE 17 is a sectional view of part of a releasable steering mechanism which is utilized in the invention;

FIGURE 18 is an enlarged sectional view of a detail of the apparatus of FIGURE 17;

FIGURE 19 is a sectional view taken along line 19—19 of FIGURE 18; and

FIGURE 20 is a sectional view taken along line 20—20 of FIGURE 18.

*General Description*

Briefly stated (and referring primarily to FIGURES 1 and 2 of the drawings), the device of the invention is a vehicle 10 having a vehicle frame 12 supported by front and rear wheels 14, 16. A mast 24 is mounted on the front of the frame for movement about a horizontal pivot 36 arranged transverse to the longitudinal axis of the frame, from a rest position in which the mast is folded back over the frame to a material handling position in which the mast extends forwardly of the frame (FIGURE 3). The mast is provided with a cable 70, 72 (FIGURE 3) which supports a material engaging device 80, 84, which may be raised or lowered by a hoist 68 mounted near the rear of the frame adjacent an engine 116, which serves as the ultimate source of power for all of the operational equipments of the vehicle.

A driver's station 124 is located at a central region of the frame and has two sets of controls, one forwardly (such as 126) and one rearwardly (such as 140) of the driver's station, and a driver's seat 144, which is arranged to face either set of controls. By manipulating the controls at the driver's station, the driver is able to control the operation of the various vehicle equipments. The driver can control the movement of the mast 24 between its rest and material handling positions through a unique drive train 50, which operates quickly and efficiently even though it is of lighter construction than comparable prior art mechanisms. The driver may control the raising and lowering of the material engaging device 80, 84. He may control the raising and lowering of a bulldozer blade 92 at the front of the vehicle frame, which blade gives additional longitudinal stability to the vehicle when it is lowered to engage the ground. The driver may control the extension and contraction of the mast along its axis (by telescoping movement of sections 32 and 34). He may control the front wheels 14 so as to turn the entire vehicle and its load. Moreover, the driver may control a rear wheel unit 16 to steer the vehicle for movement over substantial distances while power is applied to the front wheels to drive the vehicle.

*Vehicle Frame and Wheels*

The main frame 12 is supported on front wheels 14 and rear wheels 16. As used in the specification and the claims appended thereto, the terms "front" and "rear" are employed loosely rather than restrictively, because, as will become more apparent as the description proceeds, at times the front of the vehicle becomes the rear, so far as the facing of the driver is concerned, and the rear of the vehicle becomes the front.

To support the weight of the vehicle and the heavy loads that it is capable of handling, the front wheels 14 may be provided plurally, with a dual wheel unit at the left and a dual wheel unit at the right side of the vehicle frame, as shown in FIGURE 1. These wheels preferably have heavy rubber tires. In the preferred form of the invention, the rear end of the vehicle is supported by a single wheel unit 16 located on the longitudinal axis of the frame, that is, centrally between the left and the right sides. This wheel unit may also be a double unit, having two rubber tired wheels, and in the form shown wheel unit 16 is smaller in diameter than the front wheels 14. The front wheels 14 support the frame by an axle unit, which includes a differential 18. The entire front wheel assembly may be of the type manufactured by the Clark Equipment Co., and as will appear more fully hereinafter, the front wheels are arranged to be driven and braked individually as well as together. The rear wheel unit 16 is connected to the frame by an upwardly extending shaft 20 illustrated in FIGURE 17, the wheel unit being rotatably connected to the shaft 20 by a short horizontal spindle 22. As will become apparent hereinafter, the rear wheel unit 16 may be steered or allowed to swivel freely.

*Mast and Mounting*

Supported on the front of the frame 12, over the wheels 14, is a mast 24. The mast mounting may include a pair of upright posts 26 which are securely fixed to the frame at its right and left sides, respectively, by suitable framework 28 including angle braces 30. As shown in the drawings, the mast 24 is preferably of the telescoping type having a lower section 32 and an upper section 34 which slides within the lower section. In the form shown the lower section is of box-like truss construction and tapers from a wide lower end to a narrower upper end. In this form the mast has a rectangular cross-section configuration, and the front side of the lower end is secured to a horizontal pivot 36 supported between the tops of the posts 26. This construction may be seen in greater detail in FIGURES 7 and 8. The horizontal pivot may be formed by a single shaft fixed to the mast and rotatable in journals at the top of the posts 26 or by separate stub shafts which extend from opposite sides of the mast and rotate in such journals, or by any other suitable pivot arrangement. The arrangement is such that the mast may move from a rest position in which the mast is folded back over the frame, as shown in FIGURES 1 and 2, to a material handling position in which the mast extends beyond the front of the frame, as shown in FIGURE 3. In the rest position the top of the lower mast section 32 is preferably supported by a rest 38, which in the form shown has a crossbar 40 supported at the top of a vertical post 42 that is braced by an angle rod 44 extending rearwardly and by guy rods 46 extending sidewardly.

Mast Raising and Lowering Mechanism

The raising and lowering of the mast is accomplished by a drive mechanism generally designated by reference numeral 50 in FIGURES 1 and 2 and shown in greater detail in FIGURES 7 through 10. This mechanism includes an inclined track 52 having a pair of parallel rails 54 which extend along the length of the vehicle and are securely fixed to the frame 12 below the lower end of the mast 24. The rails extend upwardly and rearwardly from one side of the horizontal pivot 36 to the other, as shown in FIGURE 7. A cross-head 56, which spans the rails as shown in FIGURES 8 through 10, is pivotally connected (for movement about a horizontal axis) to one end of a hydraulic ram 60 (the piston rod end in the form shown), the other end of which is pivotally connected (for movement about a horizontal axis) to the frame at 62. The cross-head is also pivotally connected (for movement about a horizontal axis) to one end of a connecting arm 64, the other end of which is pivotally connected at 66 (for movement about a horizontal axis) to an ear 67 at the rear side of the lower end of the mast 34, that is, the side opposite to the connection to horizontal pivot 36.

The cross-head 56 is guided along the track 54 by rollers 57 mounted at its respective ends, and if the cross-head is pivotally connected to both the hydraulic ram and the connecting arm, it may rotate as a unit with its rollers. The connecting arm is preferably bifurcated so as to embrace a bearing sleeve at the end of the piston rod of the ram, suitable bearing surfaces being provided in the bifurcations to allow the pivotal movement between the connecting arm and the cross-head. In the preferred form shown, the hydraulic ram 60 is located rearwardly of the track 52 constituted by the rails 54 and extends along the length of the vehicle frame from its connection to the vehicle frame at 62 to its connection to the cross-head 56. When the mast is in its rest position folded back over the frame, as shown by the dash lines in FIGURE 7, the cross-head is located at the bottom or forward end of the track, and the hydraulic ram 60 is fully extended. If the ram is now contracted, it draws the cross-head up the track, forcing the mast to turn (clockwise as shown in FIGURE 7) about the horizontal pivot 36. If contraction of the ram is continued, the mast will reach a vertical position and then will continue past the vertical and slant forwardly beyond the front of the vehicle frame. Two forward positions are shown by the solid and dot-dash lines in FIGURE 7. During its operation, the ram pivots about its connection at 62 to the frame as shown.

FIGURES 5 and 6 illustrate for several different mast positions the angular relationship of the various elements which take part in the erection of the mast. In these diagrams the various parts are designated by the same reference numerals employed previously. At the start of the cycle of mast erection (solid line position in FIGURE 5), the ram is shortened by retraction of the piston rod. The piston rod of the ram is under tension, and the connecting arm 64 is under compression. Despite the acute angles between the ram and the connecting arm and between the connecting arm and the track, the loads are fairly light if the mast is made of a relatively lightweight material. Thus even though the hydraulic fluid is applied to the smaller face of the piston to which the piston rod is attached, sufficient power may be obtained from a relatively small and lightweight ram. The mast raises through the dot-dash line position in FIGURE 5 to the dash-line position slightly past vertical. When the mast passes its vertical position, the loads exerted by the lifting of the mast change from tension in the ram piston rod to compression and from compression in the connecting arm to tension, that is, the ram and arm resist the tendency of the mast to move under the influence of gravity. In a practical form of the invention, this occurs at about 2 degrees and 45 minutes past the center or vertical position when no load is suspended from the mast. When a material load is being handled by the mast, this condition occurs at about 8 degrees over center due to the rearward pull of the fast and dead lines 70, 72 which pass over the crown of the mast as will be described more fully hereinafter.

It is apparent that in erecting the mast to its over-center position the load on the ram is relatively high during the initial movement of the mast and decreases to zero as the mast reaches the point at which the ram load changes from tension to compression in the piston rod. Further movement of the mast past this point, (the solid line position of FIG. 6) increases the compression load on the ram and in a practical embodiment the load reaches a maximum at about 21 degrees past the vertical (the dot-dash line position in FIG. 6). The load then decreases as the mast moves farther past center and as the connecting arm 64 approaches a perpendicular relation to the track 52, at which point all of the load is transferred to the track, and the load on the ram is again zero. In the preferred form of the invention, the parts are so proportioned and correlated that this condition occurs when the mast is at its maximum over-center position (the dash-line position of FIG. 6), and in a practical embodiment it occurs at about 33 degrees over center.

If the mast is now moved back toward its center or vertical position from the full over-center-position, the hydraulic ram is again loaded, but in the opposite sense. The load again reaches a maximum at about 21 degrees past the vertical (the dot-dash line position of FIG. 6) as set forth above. When the mast passes this position, the load on the ram drops off due to the effect of the rearward pull of the fast and dead lines from the hoist and also due to the fact that more of the load is directed downwardly into the mast mounting. As indicated above, the load on the ram reaches zero at about 8 degrees (the solid line position of FIGURE 6), when the mast is handling a material load, and at about 2 degrees 45 minutes with no material load. The correlation of the effect of the fast and dead lines and the angle of the mast and track makes it possible to use a modestly sized ram and low operating hydraulic pressures when handling material loads in the operating range of about 8 degrees to about 30 degrees over-center. Moreover, mast raising and lowering is accomplished very quickly.

Mast Extension and Contraction Mechanism

The mast is extended and contracted by a hydraulic ram 48 having one end connected at 48a (FIGURE 1) to a strong cross member of the lower mast section and its other end connected at a suitable point to a strong cross member of the upper mast section 34. This ram is housed within the upper mast section when the mast is fully contracted as shown in FIGURES 1 and 2. FIGURE 3 illustrates the appearance of the mast when partially extended.

To maintain the mast in an extended position, a scheme such as that illustrated in FIGURES 11 through 13 may be employed. A series of openings 43 is formed in the sides of the upper mast member 34, the openings being spaced along the length of this mast member. At the top of the lower mast member is located a latching mechanism including a detent 45, preferably one on each side of the mast, arranged to enter the corresponding openings 43. The detent is pivoted at 47 on a suitable bracket 45a and has an operating arm 45b extending on the opposite side of the pivot point. A compression spring 49 exerts a force on arm 45b which tends to cause the detent to rotate about the pivot 47 and move into an aligned opening 43. It will be apparent that when the detents are inserted within the openings 43, the upper mast section 34 will maintain an extended position with respect to the lower mast section 32. The detents may be suitably braced and guided, as shown at 45c, to remove the load of the upper mast section from the pivot pin 47 and transfer it directly from the detents to the lower mast section. If the ends of the detents are beveled as shown at 45d in FIGURE 12, when the upper mast section 34 is extended by its hydraulic ram, the lower edges of the openings 43 will exert a camming action on the detents, causing them to be withdrawn from the openings against the bias of springs 49. As the next lowest opening 43 becomes aligned with each detent, they will snap into the openings under the bias of springs 49 and maintain the mast sections in position unless the extension of the mast is continued. When it is desired to retract the mast, a suitable force is exerted on the operating arm 45b of the detents, as by a wire attached to the operating arm, so as to withdraw the detents from the openings 43. This permits the upper mast section 34 to be drawn into the lower mast section 32. To reduce the frictional forces tending to prevent the withdrawal of the detents 45, the upper mast section may be extended very slightly to release the detents from the upper edges of the openings 43 and permit their easy withdrawal. The openings are made longer than the height of the detents to allow the detents sufficient pivotal freedom.

Hoist and Material Engaging Device

The frame 12 also supports a hoist 68 mounted toward the rear of the frame. This hoist may be a twin drum unit of the type manufactured by Wagner-Morehouse Inc. and known as "Rolahoist 25." As shown in FIGURE 3, one drum of the hoist may be utilized to wind a cable (omitted from FIGURES 1 and 2 for clarity) having a fast line 70 secured to a hoist drum, and a dead line 72 secured to the frame 12 in front of the drum. The cable passes over the crown 74 of the upper mast section, the fast line and dead line being guided, respectively, by side sheaves 76 and 78 better seen in FIGURES 1 and 2. In the form shown, the cable passes over one of the side sheaves to a sheave in a travelling block 80, then passes up and around a cross sheave 82 suspended from the front of the crown 74, around another sheave in the travelling block 80, and then over the remaining side sheave of the crown. This arrangement permits the travelling block 80 to lie in a plane parallel to the front of the mast and is described and claimed in the patent to Emil A. Bender, No. 2,440,427, issued April 17, 1948, for Crown Block Assembly. The travelling block 80 may support a hook 84, for example. The other drum of the hoist 68 may be utilized to wind a snake line 86 which may pass over an upper sheave 88 or a lower sheave 90 secured to one side of the lower mast section.

Bulldozer

Referring again to FIGURES 1 and 2, the frame 12 may also support a bulldozer blade 92 mounted across the front end of the frame. This blade is shown in greater detail in FIGURES 14 through 16 and has rearwardly extending mounting brackets 94, one at each side of the frame, which are guided for vertical movement by pins 96 which extend laterally from the respective sides of the frame through vertical slots 95 in the brackets. As shown in FIGURE 16, the pins 96 have heads 98 which are wider than the slots 95, the heads being spaced from frame portions 100 by sleeves 102, and the pins being threaded to receive nuts 104, which secure the pins in place. The brackets 94 have ear portions 106 which are connected to the piston rods 108 of hydraulic rams 110, as by pins 112, one ram being provided at each side of the frame. The upper ends of the rams, that is, the ram cylinders, are secured to the frame at 114. It will thus be apparent that by extending and contracting the hydraulic rams 110, the bulldozer blade 92 may be moved downwardly or upwardly, and the range of operation is made such that the bulldozer blade may drop far enough to engage the ground, as shown by the dash lines in FIGURE 14.

Engine and Drive Trains

At the rear end of the vehicle frame, that is, the end opposite to the bulldozer blade, is mounted an engine 116 which constitutes the ultimate source of power for all the vehicle equipments. This engine is preferably of the internal combustion type, such as a Chrysler 56 industrial engine. Since the engine 116 and the hoist 68 are mounted on the rear of the vehicle frame, they serve as counterbalances for the weight of the mast mounted on the front of the vehicle frame and for the load carried by the mast. Additional counterbalancing may be obtained by adding ballast, such as a suitable fluid contained within tanks 118 located at the rear of the vehicle.

The drive shaft of the engine is coupled to a suitable transmission (located at 119 in FIGURE 2), such as a three-speed planetary transmission with a torque converter or fluid coupling. Such a unit may be a type CRT3330 manufactured by the Allison Co. The output from the transmission is then connected to a suitable transfer case. The drive train for the front wheels 14 includes a propeller shaft 120 that is coupled at one end to the transfer case and at the other end to differential 18. The propeller shaft may be of the type 1600 manufactured by the Spicer Co. and may include suitable universal joints. The wheel units 14 are provided with individual brakes and by virtue of such brakes and the differential 18 the wheels on the respective sides of the vehicle may be driven or braked individually. The wheels may also be driven or braked together. The drive train for wheels 14 may also include a conventional friction clutch.

The transmission associated with engine 116 is also coupled through the transfer case and a differential 121 (FIGURE 2) to a chain drive (generally designated 122 in FIGURE 1) for the hoist 68. The engine also powers a suitable pump (not shown) which, through a conventional hydraulic system supplies the fluid requirements of the hydraulic rams associated with the various vehicle equipments, that is, the mast erecting ram, the mast extending ram, and the bulldozer blade rams. The hydraulic system for supplying these rams also includes the usual sump, control valves, and supply lines.

Driver's Station and Controls

At a central location on the vehicle frame is a driver's station generally designated 124 in FIGURES 1 and 2. Here are located the controls for the various vehicle equipments. These controls are arranged in two main groups, one forwardly of the driver's station and the other rearwardly of the driver's station. A number of the forward controls may be grouped on a console 126. These controls may include the bulldozer blade controls, the mast erecting controls, and a throttle for the engine 116. At each side of the console 126 may be located levers 128 which have compound movements to control brakes and clutches associated with the Wagner-Morehouse hoist 68. Beneath the console 126 may be located foot pedals, such as that indicated at 130 in FIGURE 2, for controlling individual master cylinders of the brakes of the front wheel units 14. The forward set of controls also includes a lever 132 for changing the speed of the transmission.

The rearward set of controls may include a throttle or accelerator pedal 134 (FIGURE 1) and a brake pedal 136 for braking the front wheels 14 in unison, as by controlling the master cylinders of both wheel units or operating a separate brake. Another transmission speed control lever 138 is also provided. The most prominent control of the rear group is a steering wheel 140, which, as will be seen, may be utilized to steer the rear wheel unit 16 through a steering mechanism 142, which preferably is of the power assist type.

In the form shown, a driver's seat 144 is located between the forward and rear sets of controls. This seat is mounted for movement about a vertical pivot so that the seat may face either set of controls, and suitable mechanism is preferably provided to lock the seat in either position.

*Rear Wheel Steering*

In accordance with one of the principal aspects of the invention, the rear wheel unit 16 is arranged selectively to be steered by steering wheel 140 or to swivel freely. A preferred manner of accomplishing this result is illustrated in FIGURES 17 through 20. In FIGURE 17 is illustrated a framing member 146 on which the vertical shaft 20 attached to the wheel spindle 22 is supported in bearings 148 and 150. Bearings 150 are preferably tapered roller bearings to absorb the axial thrust on the shaft 20. Shaft 20 may be formed in two parts, an outer lower part 152, and an inner upper part 154, the parts being keyed together at 156 for unitary rotary movement. At the upper end of the shaft is located a steering arm 158 having an opening through which the end of the inner shaft part 154 passes. One end of arm 158 is connected pivotally to a link 160 which forms a part of the overall steering mechanism 142 described previously in connection with FIGURE 2. The opening in arm 158 through which the inner shaft part 154 passes is generally circular but has a pair of oppositely disposed radial notches 162. The inner shaft part 154 has an axial bore 164 which receives a reciprocating guide pin 166. The upper extremity of the guide pin and the bore 164 may be enlarged correspondingly as shown. The upper extremity of the guide pin is bifurcated to form a pair of arms 168 (FIGURES 19 and 20) which embrace a transverse key 170 secured to the arms by a cross pin 172 and shaped to fit within the notches 162 of the steering arm 158 and corresponding radial notches 174 extending in opposite directions from the upper extremity of the bore 164 and alignable with the notches 162.

It should be apparent from the foregoing that when notches 162 and 174 are aligned and when the guide pin 166 is moved into the bore 164 so as to insert the key 170 in the aligned notches, the steering arm 158 is locked to the inner shaft part 154, which is in turn locked to the outer shaft part by the key 156. In this position of the key 170, wheel unit 16 may be steered from the steering wheel 140 shown in FIGURES 1 and 2. However, if key 170 is withdrawn from the notches, the shaft 20 may turn freely with respect to the steering arm 158, and the wheel unit 16 may thus swivel freely. In practice shaft part 154 may extend slightly above steering arm 158 so that the key 170 may be withdrawn from notches 162 without being fully withdrawn from notches 174, thereby requiring the key to rotate with shaft part 154 at all times but simplifying the problem of alignment of the key with the notches when it is again desired to steer wheel unit 16.

Insertion and withdrawal of key 170 is controlled by a manually operated over-center or toggle mechanism. This mechanism includes a pair of parallel vertical arms 176 which carry pins 178 (see FIGURE 19) which enter a circumferential groove track 179 formed on a disc 180 arranged transversely of the shaft 20 and preferably formed integrally with the key 170. The raising and lowering of arms 176 will produce corresponding movements of the key 170, and by virtue of the arrangement of the track 179 and the pins 178, the disc may turn with the shaft 20 relative to the arms 176. Arms 176 are supported on a bracket having a horizontal member 182 and a pair of vertical post members 184 (FIGURE 20). Horizontal pivot pins 186 pass through the arms and the posts. The arms are connected by a cross member 188 (FIGURE 19). Also mounted on the pivot pins 186 are upstanding links 190 joined at the upper ends by a cross member 192. This cross member forms a handle whereby the links 190 may be moved as a unit about the pivot pins 186. In the form shown, the links 190 are located on the outer sides of the arms 176, and the arms are provided with outwardly extending stops 194 and 195 on opposite sides of the links 190. The links may thus have a degree of relative movement with respect to the arms 176, but the arms are constrained by the stops 194 and 195 to move with the links for movement beyond this range. A coil spring 196 extends from a central region of the cross arm 192 (where it may be held by a simple notch) to an eye 198 secured to the horizontal bracket member 182. This spring is placed in tension when it is installed.

From the foregoing description it will be apparent that when the links are moved to the position illustrated in FIGURE 18, they will engage the stops 195 and urge the arms 176 to move about pivot pins 186 and insert the key 170 within the associated notches. When the links 190 are moved to the position illustrated in FIGURE 17, on the other hand, they will engage stops 194 and urge arms 176 to rotate in the opposite sense, thereby withdrawing the key 170 from the notches. Links 190 may be moved by manual engagement of the cross bar 192, and the motion of the links is a snap or toggle action by virtue of spring 196, which moves over center as the links move between the stops 194 and 195.

*Operation*

In the operation of the device of the invention, with the mast contracted and folded back in the position illustrated in FIGURES 1 and 2, the vehicle may be driven along public streets or highways. For such operation, wheel unit 16 is locked to the steering mechanism 142 in the manner previously described and is steered by the steering wheel 140, the driver's seat 144 being adjusted to face the steering wheel. The wheel units 14 are driven and braked together in a conventional manner, and the engine 116 and its transmission are controlled in a conventional manner.

When the vehicle has been moved to its site of use, the wheel unit 16 is disengaged from the steering mechanism 142, as described previously, so that the wheel unit may swivel freely. The driver's seat 144 is reversed so that the driver may face the console 126. By operating the controls provided, the driver erects the mast to an over-center or forward position, as illustrated in FIGURE 3. If desired, the mast may be extended axially in the manner previously described. The driver may then operate the hoist 68 to manipulate the travelling block 80 to lift materials, for example. Such materials may be drawn in or otherwise manipulated conjointly by the snake line 86, also controlled by the hoist. If it is desired to lift and turn a load, the driver drives and brakes the wheel units 14 individually so as to cause one wheel unit to revolve and the other to remain essentially stationary. With the wheel unit 16 swiveling free, the entire frame of the vehicle will be turned in the manner illustrated in FIGURE 4, and the desired turning of the load will be accomplished.

If it is desired to lift and move a load a moderate distance, the load may be lifted as described above and the vehicle driven and steered by applying power to wheels 14 together and selectively as required. When material handling operations have been completed, the mast is retracted and folded back over the frame of the vehicle, and the vehicle may then be driven elsewhere in the manner described.

With the construction of the invention it will be seen that during all material handling operations there are essentially no side loads on the vehicle. The mast 24 cannot turn relative to the vehicle frame about a vertical axis, and hence all the loads are longitudinal loads. The counterbalancing exerted by the engine, the hoist, and any additional ballast employed, is thus fully effective throughout all material handling operations. The vehicle of the invention is thus capable of handling much heavier loads than has heretofore been possible with any device of comparable size and weight. Moreover, if increased longitudinal stability is desired for lifting very heavy loads, the bulldozer blade 92 may be lowered until it engages the ground. In this position, the bulldozer blade provides a forward support or fulcrum which further stabilizes the vehicle. Of course, the bulldozer blade may also be used in the conventional manner to move or clear earth.

It will thus be apparent that the device of the invention has characteristics and capabilities which are greatly improved with respect to comparable vehicles or material handling devices known heretofore. Accordingly, while a preferred embodiment of the invention has been shown and described, it will be apparent to those skilled in the art, that changes can be made in this embodiment without departing from the principles and spirit of the invention, the scope of which is defined in the appended claims. For example, the principles of the invention may be applied to a "clam shell" or drag line, rather than a simple crane. A "fifth wheel" may be mounted on the front of the vehicle (the rear for road travel) to permit the pulling of a trailer, or a platform may be provided at a suitable location on the frame to carry small loads of material. The vehicle may even load and unload its own platform or trailer. The foregoing embodiment is thus to be considered illustrative, rather than restrictive of the invention, and those modifications which come within the meaning and range of equivalency of the claims are included therein.

We claim:

1. A vehicle comprising a vehicle frame, a pair of frame supporting wheels spaced across one end of said frame, means for selectively driving and braking said wheels individually or driving and braking said wheels together, at least one frame supporting wheel at the other end of the frame, means for selectively steering the last-mentioned wheel or permitting it to turn freely toward either side of said frame and two sets of controls for said wheels, said sets being located respectively forwardly and rearwardly of a driver's station on said frame.

2. The vehicle of claim 1, said vehicle having a driver's seat at said driver's station, said seat being mounted for selective orientation toward said sets of controls.

3. Apparatus for moving a mast about a horizontal pivot at its lower end comprising an inclined track adjacent said lower end and extending in a direction transverse to said pivot, a cross-head movable along said track, an arm connected to said cross-head and pivotally connected to said mast at one side of said pivot, and drive means for moving said cross-head along said track.

4. The apparatus of claim 3, said track having spaced guide rails spanned by said cross-head.

5. The apparatus of claim 4, said cross-head having rollers engaging said rails, respectively.

6. The apparatus of claim 3, said drive means comprising a hydraulic ram having a piston and a cylinder, one of which is pivotally connected to said arm at said cross-head and the other of which is pivotally connected to a supporting frame on which said track and said mast pivot are mounted.

7. The apparatus of claim 3, said drive means comprising means for moving said arm to a position in which it is substantially perpendicular to said track, whereby the load on said drive means becomes substantially zero.

8. Material handling apparatus comprising a frame, a horizontal pivot mounted above said frame, a mast having its lower end connected to said pivot whereby said mast may turn thereabout, an inclined track mounted on said frame below said pivot and extending in a direction transverse to said pivot, a cross-head movable along said track, an arm connected to said cross-head and pivotally connected to said mast, and means for moving said cross-head along said track to a position at which said arm is substantially perpendicular to said track.

9. The apparatus of claim 8, said mast having a cross-section at its lower end with spaced sides, said mast being connected to said pivot at one of said sides and being connected to said arm at the other of said sides.

10. The apparatus of claim 8, said mast being supported for movement between extreme positions on opposite sides of said pivot and said track extending beyond the sides of said mast cross-section when said cross-section is disposed horizontally.

11. The apparatus of claim 8, said moving means comprising a hydraulic ram mounted on said frame and extending in a direction transverse to said pivot, said ram having one end pivoted horizontally on said frame beyond said track and the other end pivoted horizontally to said arm at said cross-head.

12. The apparatus of claim 8, said mast having a material engaging means suspended from a cable passing over the mast and secured to the frame at a point to one side of said mast pivot, the load on said cable and the weight of said mast interacting to produce substantially zero load on said drive means for at least one position of said mast.

13. Apparatus of the type described, comprising a frame, a horizontal pivot supported on and spaced above said frame, a mast having a lower end connected to said pivot along one side of the mast whereby the mast may turn eccentrically on said pivot from a position at one side of said pivot to a position at the other side, an inclined track below said pivot and extending transversely thereto, a cross-head movable along said track, an arm connected to said cross-head and pivotally connected to the lower end of said mast at its other side, and a hydraulic ram having one end pivotally connected to said frame at a point beyond the higher end of said track and its other end pivotally connected to said arm at said cross-head.

14. In apparatus of the type described, a frame, a shaft mounted in bearings on said frame, a wheel rotatably mounted on one end of said shaft, the other end of said shaft having a transverse notch, a steering arm having an opening through which said shaft passes freely, said opening having a notch alignable with the shaft notch, a locking device movable axially of said shaft and having a key arranged to move into said notches when aligned to couple said shaft to said arm, said locking device having a rod connected to said key and extending into an axial bore in said shaft for reciprocatively guiding said key and a toggle mechanism mounted on said frame for moving said locking device between locking and unlocking position.

15. In apparatus of the type described, a frame, a shaft mounted in bearings on said frame, a wheel rotatably mounted on one end of said shaft, the other end of said shaft having a transverse notch, a steering arm having an opening through which said shaft passes freely, said opening having a notch alignable with the shaft notch, and a locking device movable axially of said shaft and having a key arranged to move into said notches when aligned to couple said shaft to said arm, said locking device having a rod connected to said key and extending into an axial bore in said shaft for reciprocatively guiding said key, and said locking device having a disc attached to the key and extending transversely to said rod, said disc having a circumferential track, and a lock operating mechanism mounted on said frame and having an operating element along which said track is movable.

16. In apparatus of the type described, a frame, a shaft mounted in bearings on said frame, a wheel rotatably mounted on one end of said shaft, the other end of said shaft having a transverse notch, a steering arm having an opening through which said shaft passes freely, said opening having a notch alignable with the shaft notch, a locking device movable axially of said shaft and having a key arranged to move into said notches when aligned to couple said shaft to said arm, said locking device having a rod connected to said key and extending into an axial bore in said shaft for reciprocatively guiding said key, and means for holding said key out of at least one of said notches to permit said shaft to swivel free of said steering arm.

17. An extensible mast construction comprising a first hollow tubular mast section, a second hollow tubular mast section telescoping with the first section, a plurality of abutments spaced along the length of one of said sections, and a detent mounted on the other section and movable transversely to said sections to lock under said abutments selectively, said abutments comprising the edge surfaces of openings in the wall of said one section into which said detent moves, said detent being spring biased into said openings and having an end surface which is beveled to allow the lower edge surfaces of said openings to move said detent out of said openings against said bias when said one section is extended.

18. A self-propelled vehicle for lifting and carrying material, comprising an elongated vehicle frame supported on a pair of front wheels located at opposite sides of said frame and a rear wheel located between the sides of said frame, an engine mounted on the rear of said frame, a drive train connecting said engine and said front wheels to drive the same, said drive train including brake means for braking said front wheels individually, a steering mechanism on said frame for steering said rear wheel, means on said frame for releasably locking said rear wheel to said steering mechanism whereby said rear wheel may be steered or allowed to swivel freely selectively, a material lifting mast mounted on the front of said frame for movement about a horizontal pivot transverse to the length of said frame between extreme positions in which said mast is respectively folded back over said frame and is extended beyond the front of said frame, a drive train connecting said engine and said mast for moving the mast about said pivot, a driver's station between the front and rear wheels and operating controls for said drive trains located on said frame at said driver's station, some of said controls being located at the front of said driver's station and others at the rear of said driver's station, whereby said driver may face the front of said vehicle to perform certain driving operations and may face the rear of said vehicle to perform certain driving operations.

19. The vehicle of claim 18, said vehicle having a hoist supported on said frame adjacent said engine, said mast having a cable which passes over the crown of the mast and includes a fast line connected to said hoist and a dead line connected to said frame, said cable supporting a material engaging means at the front of said frame, and said hoist having a drive train connecting it to said engine.

20. The vehicle of claim 19, said mast having telescoping sections, and drive train coupled to said engine and including a hydraulic ram for extending and retracting said mast axially.

21. The vehicle of claim 20, said vehicle having an adjustable support at the front of said frame and a drive train coupled to said engine and including a hydraulic ram for moving said support to engage the ground.

22. The vehicle of claim 18, said mast moving drive train comprising a hydraulic ram having one end pivotally connected to a mast moving member.

23. The vehicle of claim 18, said mast moving drive train comprising an inclined track mounted on said frame below said mast, a cross-head movable along said track, an arm connecting said cross-head and said mast, and a hydraulic ram mounted on said frame and connected to said cross-head.

24. A self-propelled material handling vehicle comprising a vehicle frame supported on front and rear wheels, a material handling mast mounted on one end of said frame for movement about a horizontal pivot between a rest position and a material engaging position, and separate vehicle steering means including said front and rear wheels, respectively, for steering said vehicle in a first manner when said mast is in rest position and in a second manner when said mast is in material engaging position.

25. A material handling vehicle comprising a vehicle frame supported on front and rear wheels, a mast pivoted on said frame adjacent its front end, for movement about a horizontal axis transverse to the front-to-rear axis of said vehicle and having a material-engaging means connected thereto, operating means supported on said frame for moving said mast between extreme positions in which said mast is respectively folded back over the vehicle frame and extended forwardly of the vehicle frame and means at said front end adjustable to engage the ground and to provide a forward support fulcrum for said mast.

26. A material handling vehicle comprising a vehicle frame supported on front and rear wheels, a mast pivoted on said frame adjacent its front end, for movement about a horizontal axis transverse to the front-to-rear axis of said vehicle and having a material-engaging means connected thereto, operating means supported on said frame for moving said mast between extreme positions in which said mast is respectively folded back over the vehicle frame and extended forwardly of the vehicle frame, a bulldozer blade supported in front of said frame and means to move the blade downwardly to engage the ground and provide a forward support fulcrum for said mast.

References Cited in the file of this patent

UNITED STATES PATENTS

| | | |
|---|---|---|
| 483,001 | Hughes | Sept. 20, 1892 |
| 966,346 | Morton | Aug. 2, 1910 |
| 1,105,594 | Lundin | July 28, 1914 |
| 1,591,965 | Davis | July 13, 1926 |
| 1,716,732 | Mossay | July 11, 1929 |
| 2,063,920 | Friestedt | Dec. 15, 1936 |
| 2,502,108 | Taylor | Mar. 28, 1950 |
| 2,621,803 | Taylor | Dec. 16, 1952 |
| 2,650,100 | Ronning | Aug. 25, 1953 |
| 2,782,939 | Bernaerts | Feb. 26, 1957 |
| 2,809,756 | Bannister | Oct. 15, 1957 |
| 2,887,191 | Lovell | May 19, 1959 |

FOREIGN PATENTS

| | | |
|---|---|---|
| 52,541 | France | June 5, 1944 |
| 500,088 | Italy | Nov. 17, 1954 |